United States Patent [19]

Gille

[11] Patent Number: 5,468,013
[45] Date of Patent: Nov. 21, 1995

[54] DUAL AIR BAG SYSTEM FOR OCCUPANT RESTRAINT

[75] Inventor: Lennart A. Gille, West Hills, Calif.

[73] Assignee: TRW Inc., Redondo Beach, Calif.

[21] Appl. No.: 295,954

[22] Filed: Aug. 25, 1994

Related U.S. Application Data

[63] Continuation-in-part of Ser. No. 161,711, Dec. 3, 1993, Pat. No. 5,435,594.

[51] Int. Cl.⁶ .......................... B60R 21/24; B60R 21/28; B60R 21/32
[52] U.S. Cl. .......................... 280/729; 280/735; 280/739
[58] Field of Search ........................ 280/739, 736, 280/735, 734, 729, 728 R, 730 R, 742, 741, 740, 738, 728.1, 730.1; 180/282

[56] References Cited

U.S. PATENT DOCUMENTS

| | | | |
|---|---|---|---|
| 3,633,159 | 1/1972 | Dillman | 280/736 |
| 3,684,309 | 8/1972 | Uchiyamada et al. | 280/735 |
| 3,752,501 | 8/1973 | Daniel et al. | 280/729 |
| 3,884,499 | 5/1975 | Oka et al. | 280/739 |
| 5,184,845 | 2/1993 | Omura | 280/739 |
| 5,232,243 | 8/1993 | Blackburn et al. | 280/735 |
| 5,330,226 | 7/1994 | Gentry et al. | 280/739 |

FOREIGN PATENT DOCUMENTS

| | | | |
|---|---|---|---|
| 2060858 | 3/1990 | Japan | 280/735 |

*Primary Examiner*—Margaret A. Focarino
*Assistant Examiner*—Peter C. English

[57] ABSTRACT

An inflatable vehicle passenger restraint system has an inner and an outer air bag which are both coupled to a manifold which provides inflation gas produced by a gas generator. When the gas generator is activated, inflation gas quickly inflates the smaller inner air bag and simultaneously inflates the outer air bag at a slightly slower rate, thereby more fully protecting an out of position occupant by filling the outer air bag with a relatively slow fill rate as compared to the inner air bag. The inflatable restraint system preferably includes a control arrangement for controlling the deflation rate of at least one of the inner and outer air bags.

20 Claims, 2 Drawing Sheets

DUAL AIR BAG SYSTEM FOR OCCUPANT RESTRAINT

This is a continuation-in-part application of U.S. Ser. No. 08/161,711, filed Dec. 3, 1993, U.S. Pat. No. 5,435,594.

BACKGROUND AND SUMMARY OF THE INVENTION

The present invention relates to an inflatable Vehicle passenger restraint system that restrains an occupant during the critical period of an impact. More particularly, the present invention relates to such a system incorporating dual air bags arranged such that an inner air bag is located substantially within an outer air bag.

Inflatable restraint systems have become commonplace for passenger protection. Current federal regulations require all automobiles manufactured within the United States to be equipped with a passive restraint system, either an inflatable restraint system such as an air bag or a passive seat belt.

A typical inflatable restraint system includes three basic components: a crash sensing mechanism which mounts to the vehicle frame, an air bag assembly located within the passenger compartment and an inflater assembly to deploy and inflate the air bag. In operation, the air bag is inflated before there is appreciable vehicle—occupant interaction. The air bag is next quickly permitted to deflate, thereby providing a dampered deceleration of the occupant. The air bag must have sufficient capacity to arrest the forward motion of the occupant relative to the vehicle interior without allowing the occupant to penetrate through the air bag and impact the underlying vehicle structure while also having sufficient cushioning to prevent occupant injury directly from the air bag.

While single bag construction remains the predominant approach, inflatable occupant restraint systems incorporating multiple air bags have been previously proposed in the prior art. For example, a typical arrangement having multiple air bags inflates a first air bag to envelope the occupant and a second air bag which functions as a knee bolster is disclosed in U.S. Pat. No. 4,360,223 issued to Kirchoff. Such prior dual bag constructions are directed to systems incorporating multiple air bags designed to independently function.

None of the prior art, however, is without its problems. One problem with traditional inflatable restraint systems involves an inability to adequately protect occupants of a vehicle other than the driver. This problem is inherent in traditional inflatable restraints due to a lack of a flexibility in air bag inflation and deflation rates. The positioning of a driver within a vehicle is relatively predictable. The difficulty in protecting passengers ,other than the driver is the potential of those passengers being "out of position." Passengers other than the driver are not as constrained as to how or where they position themselves within the vehicle. The most significant danger to the "out of position" occupant occurs when they are located in a position forward of a seated position. In such situations, the "out of position" occupant often contacts the air bag while it is still rapidly expanding with tremendous force.

Another problem with traditional inflatable restraint systems is an inability to protect vehicle occupants during continued vehicle motion, resulting from collision or other loss of vehicle control such as vehicle roll over. Current systems are designed to employ, or inflate, upon the detection of significant change in forward motion and thereafter almost immediately deflate. As such, traditional inflatable restraint systems are not adapted to function in response to a rolling-type motion. Furthermore, such systems are not adapted to protect vehicle occupants during continuation of transverse, or rolling-type, motion.

Inflatable restraint systems are designed to deploy and inflate during the time interval between the initial sensing of the impact by a crash sensing mechanism and appreciable resulting forward movement of the occupant relative to the vehicle interior. Because this time interval lasts only milliseconds, the air bag must inflate almost instantaneously with a tremendous flow rate of gas. This tremendous flow rate produces what is commonly referred to in the art as a "hard fill". This "hard fill" can be likened to a small explosion that is contained by the internal boundaries of the air bag.

Ideally, the forces produced during inflation are entirely self-contained by the air bag through its full expansion prior to the occupant initiating contact with the air bag. If the occupant is improperly seated, or "out of position", the impact of the explosion may be partially absorbed by the occupant. As a result, the occupant may suffer an injury from the expansion process of the air bag.

The preferred embodiment of the present invention provides an inflatable restraint system in which an air bag for directly contacting the occupant is inflated at a softer than typical fill rate, thereby minimizing injury resulting from the rapid inflation of the air bag. The preferred embodiment of the inflatable restraint apparatus of the present invention includes an air bag housing and inner and outer air bags securely attached to the air bag housing. The inflatable restraint apparatus further includes a gas generator for generating a gas when activated and a manifold. The manifold is in communication with the gas generator and includes a plurality of discharge ports. At least one of the discharge ports is in communication with the inner air bag. Similarly, at least one of the discharge ports is in communication with the outer air bag.

In a first alternative embodiment, the present invention incorporates multiple inner air bags. A first or main airbag serves to cushion one or more vehicle occupants from forward impact. Second and third inner air bags protect the vehicle occupants from the edges of the vehicle seats or the vehicle doors.

In a second alternative embodiment, the present invention additionally incorporates motion sensing means, including a crash sensor for generating an air bag inflation signal and a triaxial accelerometer for detecting acceleration along each of the three orthogonal axes of direction and generating an air bag deflation signal. The second alternative embodiment further includes a controller operative with the motion sensing means and the actuator for inflating the inner and outer air bags and controlling the rate and/or initiation of deflation of at least one of the air bags. The motion sensing means functions to more fully protect vehicle occupants during situations involving vehicle roll over.

BRIEF DESCRIPTION OF THE DRAWINGS

The various advantages of the present invention will become apparent to those skilled in the art after reading the following specification and by reference to the drawings in which.

DETAILED DESCRIPTION OF THE PREFERRED EMBODIMENT

Figure 1:
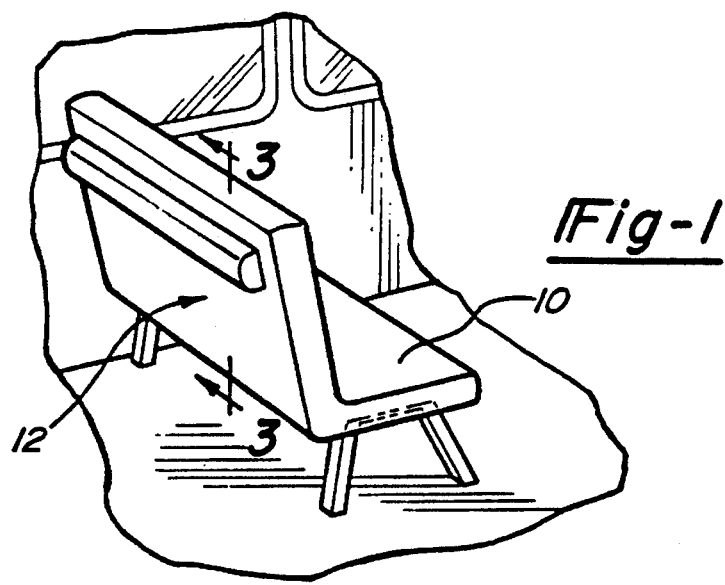
FIG. 1 is a perspective view of an apparatus made in accordance with the preferred embodiment of this invention shown attached to the rear of a school bus seat.
Figure 2:
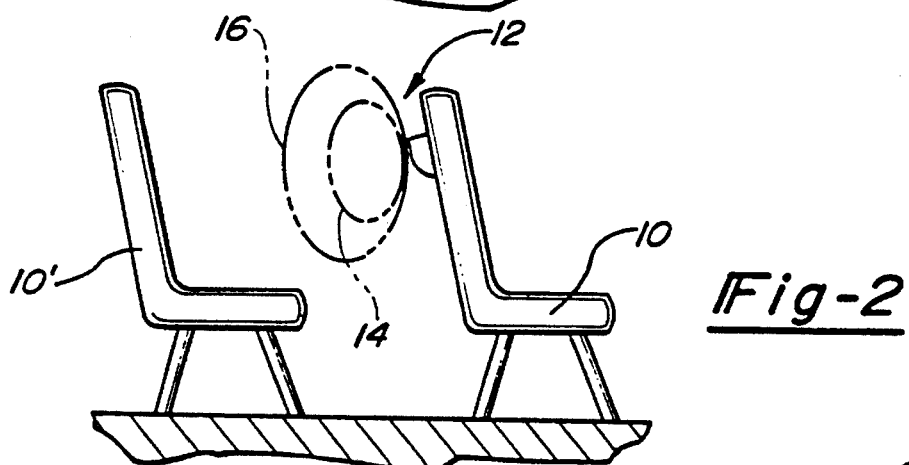
FIG. 2 is a right-side view of the apparatus with the inner and outer air bags shown in phantom fully expanded and inflated.

Turning to FIGS. 1 and 2, illustrated is a seat 10 of the type typically used in vehicles such as buses, trains, and the like. An inflatable restraint apparatus 12 constructed in accordance with the teachings of the present invention is attached to the back of the seat 10 for the protection of passengers seated in a similar seat 10' immediately therebehind. It will be appreciated by those skilled in the art, that the environment into which the inflatable restraint apparatus 12 of the present invention is incorporated is merely exemplary, and that the teachings of the present invention are not limited to applications illustrated herein.

Figure 3:
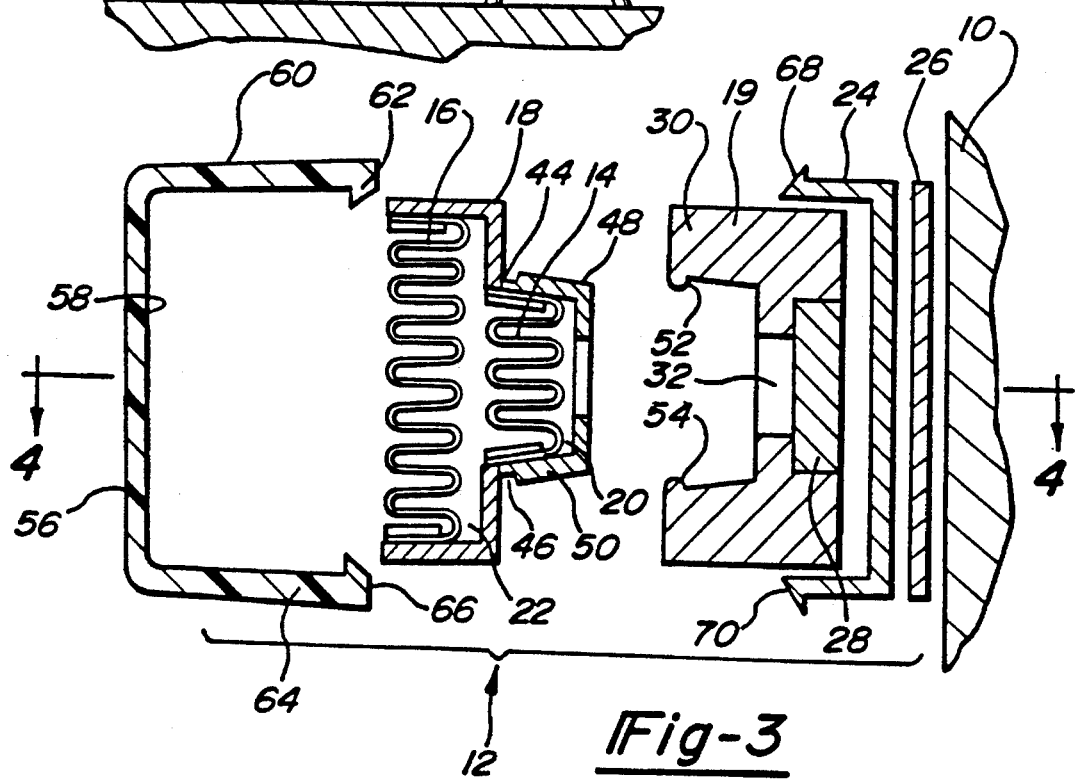
FIG. 3 is a partially exploded sectional left-side view of the apparatus taken along lines 3—3 of FIG. 1.
Figure 4:
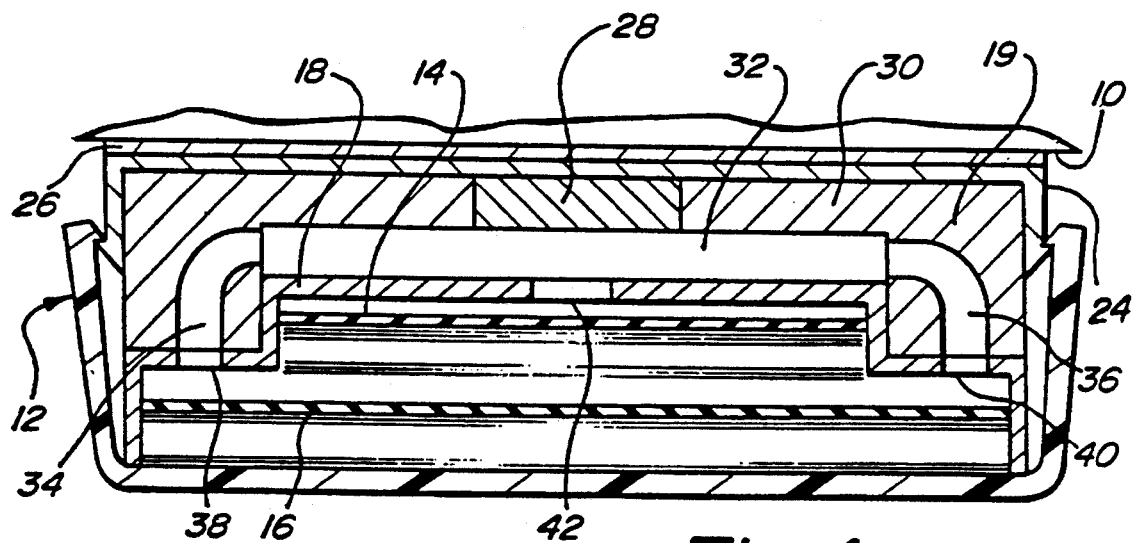
FIG. 4 is a sectional view of the gas generator and attached manifold of the present invention taken along lines 4—4 of FIG. 3.

Referring additionally to FIGS. 3 and 4, the inflatable restraint apparatus 12 of the present invention is shown to preferably include first and second air bags 14 and 16, an air bag housing 18, a gas generator assembly 19, and mounting means for operatively attaching the apparatus 12 to a vehicle. The first and second air bags 14, 16 are constructed of any suitable material well known to those skilled in the art, including but not limited to laminated plastic films. The first and second air bags 14, 16 are substantially impervious to inflation and are designed to withstand the high gas pressures that are produced during inflation. As shown in phantom in FIG. 2, the first and second air bags 14, 16 are disposed such that the first air bag 14 is completely enveloped by the second air bag 16 upon deployment.

Prior to activation, the housing 18 contains both the inner air bag 14 and the outer air bag 16 which are in a stored, or pre-inflated state. Each of the air bags 14,16 is conventionally attached directly to the air bag housing 18. Preferably, the air bag housing 18 is an elongated member capable of spanning substantially the entire length of the seat 10. In the preferred embodiment, the air bag housing 18 defines an inner bag cavity 20 and an outer bag cavity 22. The inner bag 14 is securely attached to the interior portion of the air bag housing 18 which defines the inner bag cavity 20 in accordance with any suitable manner well know in the art. The outer bag 16 is similarly attached to the interior portion of the air bag housing 18 which defines the outer bag cavity 22.

The air bag housing 18 is disposed in communication with the gas generator assembly 19 which, in turn, attaches to a unit mounting member 24. Between the unit mounting member 24 and the seat 10 is located a gasket 26. The gasket 26 is formed from plastic or rubber.

The gas generator assembly 19 includes an inflator 28 and a housing 30. Gas is generated by the gas generator assembly 19 upon ignition of solid, volatile propellant disposed within the inflator 28. The internal structure and operation of the inflator 28 can be of a number of well known structures and forms no part of the present invention.

As illustrated in FIG. 4, the gas generator housing 30 and the air bag housing 18 of the preferred embodiment define a manifold 32. It will be appreciated by those skilled in the art that alternatively the manifold 32 could be defined entirely by the gas generator housing 30. In the preferred embodiment, the inflator 28 is securely mounted to the gas generator housing 30. The inflator 28 is of conventional construction and is adapted to produce inflation gas, such as nitrogen gas, to rapidly expand the inner and outer air bags 14,16. As will be discussed further below with respect to the embodiment of FIG. 6, the gas generator assembly 19 is operatively connected to a control arrangement adapted to sense impact and control inflation and subsequent deflation of the air bags 14,16. In a vehicle in which multiple inflatable restraint systems 12 of the present invention are incorporated it may alternatively be desired to connect multiple systems 12 to a single gas generator assembly 19. The gas generator housing 30 of the preferred embodiment, includes two passage ways 34,36 which are in communication with the manifold 32. The passage ways 34,36 serve to route inflation gas to aligning first and second discharge ports 38,40, respectively, which are provided in the air bag housing 18. The first and second discharge ports 38,40 directly provide inflation gas to the outer air bag cavity 22, thereby inflating the outer air bag 16. A third gas discharge port 42 is provided in the air bag housing 18 directly adjacent the manifold 32. It will be appreciated by those skilled in art that the particular number of ports provided for inflation of the inner and outer air bags 14,16 may be readily altered as required for particular applications. As a result, such modifications are clearly within the scope and spirit of the subject invention.

When inflation gas is generated by the gas generator assembly 19, the inflation gas simultaneously inflates the inner air bag 14 through the third gas discharge port 42 and the outer air bag 16 through both the first gas discharge port 38 via the first passage way 34 and the second gas discharge port 40 via the second passage way 36. When the inner air bag 14 becomes fully inflated, the remaining inflation gas produced is then diverted to complete the inflation of the outer bag 16. The fill rate of the air bags 14,16 as well as the proportional flow into each bag can be directly adjusted by altering the size of the gas discharge ports 38,40,42.

Further, in the preferred embodiment, the total area of the two gas discharge ports 38,40 serving to fill the outer air bag 16 is approximately equivalent to the area of third gas discharge port 42 which serves to fill the inner bag 14. This design causes the inner air bag 14, because of its smaller volume and equivalent fill rate, to achieve a "hard fill" and fully expand faster than the outer air bag 16 which will expand with a "softer" fill rate in order to protect the occupants.

The in-position occupant will thus encounter completely filled inner and outer air bags 14,16, thereby providing additional security in case of rupture of either the inner bag 14 or outer bag 16. Alternatively, should the inner air bag 14 rupture, the occupant will be at least partially cushioned by the outer bag 16. The probability of both bags 14,16 simultaneously rupturing is significantly less than that of either bag 14,16 rupturing alone.

The out-of-position occupant may encounter the outer air bag 16 prior to its full expansion. The slower fill rate concept of the present invention provides a reduced impact on the occupant from the outer bag 16 expansion. In such a situation, the outer air bag 16, which is not fully expanded, will have a reduced cushioning effect, but will be compensated in a significant degree by the hard fill of the inner air bag 14.

The air bag housing 18 has first and second channels 44,46 formed in the inner periphery of top and bottom horizontal surfaces 48,50 which define the inner air bag cavity 20. The channels 44,46 accept first and second ribs 52,54 integrally formed in the gas generator housing 30, thereby serving to retain the air bag housing 18. This type of non-invasive mounting substantially eliminates any air leakage in the system. If necessary, additional means for fastening, such as screws may be incorporated. The gas generator housing 30 can be attached to the mounting member 24 with adhesive alone, or if necessary, in combination with screws, clips or bolts (not shown).

While stored, the air bags 14,16 of the present invention are enclosed by a cover 56. The cover 56 is constructed of a urethane type foam and further covered with vinyl. As is known in the art, the inside 58 of the cover 56 has an internal V-shaped recess (not shown) disposed in a predetermined configuration. The V-shaped recess selectively weakens the cover 56 at a predetermined location to enable the cover 56 to separate into segments when the air bags 14,16 are being deployed. Preferably, the cover 56 includes sufficient padding (not shown) to provide cushioning for minor impacts insufficient to trigger deployment of the air bags 14,16.

As seen in FIG. 3, the cover 56 for the inflatable restraint apparatus 12 includes a top edge 60 with a first inwardly extending portion 62 and a bottom edge 64 with a second inwardly extending portion 66. The inwardly extending portions 62,66 serve to cooperatively engage first and second outwardly extending portions 68,70 of the mounting member 24, respectively.

Figure 6:
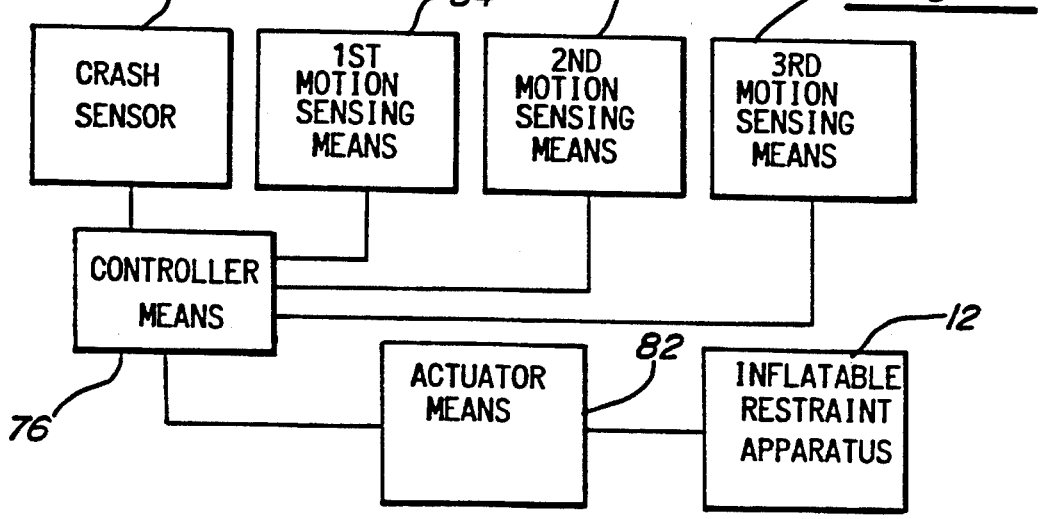
FIG. 6 is of a second alternative embodiment schematic representation constructed in accordance with the teachings of the present invention..

In operation, the inflatable restraint apparatus 12 of the present invention is activated by a signal delivered from the crash sensing mechanism 72 (schematically represented in FIG. 6 with respect to a second alternative embodiment). The crash sensing mechanism 72 is arranged to sense crash impacts of a vehicle and to initiate actuation of the inflatable restraint system 12 for impacts occurring above a predetermined minimum speed, typically of 12 to 15 miles per hour.

When gas is generated, the initial resultant flow rate into the inner bag 14 and the outer bag 16 is approximately identical. Since the outer air bag 16 is substantially larger in volume than the inner air bag 14, the identical flow rates cause the inner air bag 14 to fully inflate and expand first. As the inner bag 14 fills, it will begin to offer a higher resistance to additional filling while the outer bag 16 still has a great pressure differential and lower pressure. Additional inflation gas will be diverted from the inner bag 14 to fill the outer bag 16, thus providing a gradually faster fill rate for the outer bag 16. When the inner bag 14 is completely expanded, the outer bag 16 will complete its filling utilizing the remaining gas generated. This sequence of inflation allows the inner air bag 14 to inflate with a relatively hard fill, thereby becoming quickly operative, while still allowing the outer air bag 16 to fill with a relatively soft fill to better protect the occupant from injury.

Figure 5:
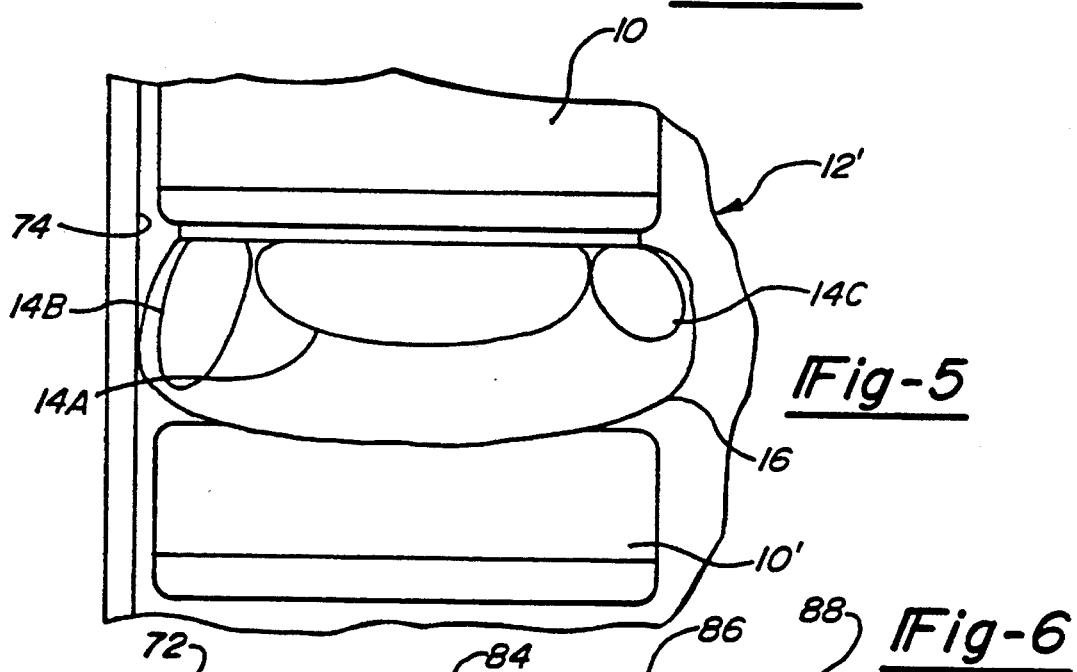
FIG. 5 is a top view of a first alternative embodiment constructed in accordance with the teachings of the present invention and incorporating multiple inner bags.

Referring next to FIG. 5, illustrated is a first alternative embodiment of the present invention. In this embodiment, multiple inner air bags 14A–14C are incorporated in order to protect the vehicle occupants. Specifically, a main or first inner bag 14A serves to cushion the occupant against forward impact. A second inner bag 14B cushions against impact with the vehicle wall 74 or door (not shown) and a third inner bag 14C cushions against impact with the edge of the seat 10.

Turning next to FIG. 6, schematically illustrated is a second alternative embodiment constructed in accordance with the teachings of the present invention. As in the preferred embodiment, the second alternative embodiment preferably includes an inner air bag 14 and an outer air bag 16, a gas generator 19 and a manifold 32 in communication with the gas generator 19 which has a plurality of discharge ports 38,40,42. At least one of the discharge ports 42 is in fluid communication with the inner air bag 14 and at least one of the discharge ports 38 or 40 is in communication with the outer air bag 16. The elements of the second alternative embodiment common with the preferred embodiment have been schematically represented in FIG. 6 as inflatable restraint apparatus 12.

The second alternative embodiment further includes motion sensing means, controller means 76 for controlling the inflation and deflation of the inner and outer air bags 14, 16 and actuator means 82.

The actuator means 82 comprises any of a number of actuators operable to trigger the gas generator 19 known to those skilled in the art.

The motion sensing means preferably includes the crash sensor 72 and a triaxial accelerometer, including first, second and third motion sensing means 84, 86, 88 for detecting motion along each of the X, Y and Z axes, respectively. The crash sensor 72 is operative for generating an air bag inflation signal upon detection of vehicle impacts or other loss of vehicle control. The triaxial accelerometer is operative for generating an air bag deflation signal as a function of motion detected along each of the three orthogonal axes of direction.

The controller means 76 is operative for controlling the inflation and deflation of the inner and outer air bags 14,16. In this regard, the controller means 76 cooperatively functions; with the motion sensing means 84,86,88 and the actuator means 82 for inflating the inner and outer air bags 14, 16 in response to the air bag inflation signal. The controller means 76 controls the deflation of at least one of the air bags 14,16 in response to the air bag deflation signal. The controller means 76 preferably includes deflating means for delaying and retarding deflation of at least one of the inner and outer air bags 14, 16.

The deflating means preferably includes a suitable valve structure (not shown) operable to maintain sufficient pressure within at least one of the inner and outer air bags 14, 16. For example, the deflating means may include a variable valve operable to selectively control flow rate and/or cycle timing. Alternatively, the deflation means may include a continued delivery of gas to at least one of the air bags 14, 16. It will be appreciated by those skilled in the art, that any other suitable means for retarding or delaying deflation of at least one of the inner and outer air bags 14, 16 can be incorporated without departing from the teachings of the present invention.

Collectively, the motion sensing means 84, 86, 88 are operable to detect linear motion in any direction. As such, the sensing means 84, 86, 88 are also operative to sense rotational motion, such as that which would occur during vehicle roll over, spinning or both. The motion sensing means 84,86,88 cooperate with the controller means 76 and the actuation means 82 to control inflation and deflation of the inflatable restraining apparatus 12. The second alternative embodiment is schematically illustrated to include the inflatable restraining apparatus 12 of the preferred embodiment of the present invention. However, it will be appreciated by those skilled in the art, any suitable inflatable restraint apparatus can be incorporated into the second alternative embodiment.

The motion sensing means 84, 86 and 88, as well as the crash sensor 72 electrically communicate signals to the controller means 76. The crash sensor 72 conventionally functions to control the initiation of inflation of the air bags 14, 16. The sensing means 84,86,88 are specifically adapted to control air bag deflation rates.

Preferably, the motion sensing means 84, 86 and 88 of the present invention function to delay, or postpone, deflation of the inner bag 14 (see FIGS. 3 and 4) of the inflatable restraint apparatus 12. In this regard, the motion sensing means 84,86,88 delay initiation of deflation of the inner bag 14, thereby maintaining the inner bag 14 in an operative condition. However, particular situations may require that the motion sensing means 84, 86 and 88 function to retard, or slow the rate of deflation, of the inner bag 14. Still yet, other applications may desire delay and/or retardation of deflation of the outer air bag 16, or both air bags 14, 16. It should be understood by those skilled in the art that the duration of the delay and/or retardation may be variable, dependent on the force of impact or continued sensing of motion of the vehicle.

In operation, upon detection of a sufficient impact, the crash sensor 72 sends a signal to a controller means 76 (as shown in FIG. 6). The controller means 76 then sends a resulting signal to the actuator means 82, causing the inflator 28 of the gas generator assembly 19 to produce inflation gas such as nitrogen gas, to fill the inner and outer air bags 14,16.

When an automobile is involved in an accident which includes vehicle roll over or spinning, or both, a typical air bag system both inflates and deflates significantly before the vehicle comes to rest. The motion sensing means 84, 86 and 88 of the present invention are further operative to detect linear and/or rotational motion associated with vehicle roll over. Accordingly, the inflatable restraint system 12 is designed such that the inner air bag 14 or both air bags 14,16 of the dual air bag construction remain inflated until the vehicle ceases to roll and/or spin, thereby further protecting vehicle occupants from injury.

With vehicles such as buses and trains having a higher center of gravity and a larger internal volume, a slightly different situation is presented. Due to their higher center of gravity, such vehicles typically do not tend to roll over, but are more susceptible to tipping. Also, with vehicles such as buses and trains, occupants are typically not restrained with seat belts and no provisions for vehicle occupants to grasp for restraint are provided. Thus, the present invention satisfies a need to protect vehicle occupants throughout a tip over, and also to restrain the occupants in their seats.

The motion sensing means 84, 86 and 88 of the present invention are preferably incorporated into a single housing multidirectional sensor which is adapted to measure acceleration in the three mutually-perpendicular axes. Further preferably, the multidirectional sensor is a piezoresistive triaxial accelerometer. A suitable triaxial accelerometer is available from Endevco Corporation of San Juan Capistrano, Calif., as Model 7267A. However, it will be appreciated by those skilled in the art that any suitable accelerometer or combination of accelerometers can be incorporated. For example, alternatively the present invention can be designed to incorporate multiple single axis accelerometers.

Although the invention has been described in detail with reference to a certain embodiment and specific examples, variations and modifications exist within the scope and spirit of the invention as described and as defined in the claims. For example, it is envisioned that two or more gas generators could be incorporated. A first gas generator would force gas through a first manifold to an inner air bag 14 and a second gas generator (not shown) would independently force gas through a second manifold (not shown) into an outer bag 16. Such a construction would allow for independent fill of the inner and outer air bags 14,16, thereby allowing the air bags 14,16 to achieve different ultimate pressures upon full expansion. This alternative construction, while not preferred because of increased manufacturing expense and other factors, should fall within the spirit of this invention.

Further, it is envisioned that the subject inflatable restraint system could be incorporated into numerous other vehicle types. For example, an inexhaustive list of adaptable vehicles would include the illustrated bus, an individual passenger car, taxi cabs, trucks, and trains. It is also envisioned that the subject invention could be incorporated in rest rooms, service and express areas on trains, buses, airplanes, etc., where passengers otherwise would not have the benefit of any restraint system. These alternative applications should also fall within the spirit of this invention.

What is claimed is:

1. An inflatable restraint system for use in a vehicle for protecting at least one vehicle occupant from injury during collision or other loss of vehicle control, the system comprising:

an air bag housing;

at least one air bag securely attached to said air bag housing;

inflating means for inflating said at least one air bag;

a crash sensor being operative with said inflating means for controlling the inflation of said at least one air bag:

deflating means for controlling deflation of said at least one air bag directly in response to cessation of motion of said vehicle; and motion sensing means for sensing motion of the vehicle, said motion sensing means being operative with said deflating means for controlling the deflation of said at least one air bag;

whereby controlled deflation of said at least one air bag further protects the at least one occupant from injuries which often result from collision or other loss of vehicle control.

2. The inflatable restraint system of claim 1 wherein said motion sensing means is operative to sense linear motion of the vehicle along each of the three orthogonal axes of direction.

3. The inflatable restraint system of claim 1 wherein said motion sensing means is operative to sense rotational motion of the vehicle.

4. The inflatable restraint system of claim 1 wherein said motion sensing means comprises a triaxial motion sensor.

5. The inflatable restraint system of claim 1 wherein said motion sensing means comprises an accelerometer for sensing an acceleration of the vehicle.

6. The inflatable restraint system of claim 1 wherein said motion sensing means is operative with said deflating means to delay the deflation of said at least one air bag.

7. The inflatable restraint system of claim 1 wherein said motion sensing means is operative with said deflating means to retard the deflation of said at least one air bag.

8. The inflatable restraint system of claim 1 wherein said at least one air bag comprises an inner air bag and an outer air bag, said outer air bag adapted to substantially fully envelope said inner air bag upon inflation of said inner and outer air bags.

9. The inflatable restraint system of claim 8 wherein said motion sensing means is operative with said deflating means to control the deflation of said inner air bag.

10. The inflatable restraint system of claim 8 wherein said motion sensing means is operative with said deflating means to control the deflation of said outer air bag.

11. The inflatable restraint system of claim 8 wherein said motion sensing means is operative with said deflating means to control the deflation of said inner air bag and said outer air bag.

12. An inflatable restraint system for use in a vehicle for protecting at least one vehicle occupant from injury during collision or other loss of vehicle control, the system comprising:

an air bag housing;

at least one air bag securely attached to said air bag housing;

actuator means for inflating and deflating said at least one air bag;

motion sensing means for sensing motion of the vehicle;

controller means being operative with said motion sensing means and said actuator means for controlling the inflation and deflation of said at least one air bag such that deflation of said at least one air bag is delayed until cessation of motion of said vehicle; and whereby controlled deflation of said at least one air bag further protects the at least one vehicle occupant from injuries which often result from collision or other loss of vehicle control.

13. The inflatable restraint system of claim 12 wherein said motion sensing means generates a first control signal in response to an initial vehicle collision or other loss of vehicle control and a second control signal in response to vehicle motion resulting from said initial vehicle collision, said first control signal being operative with said controller means for initiating inflation of said at least one air bag and said second control signal being operative with said controller means for controlling deflation of said at least one air bag.

14. The inflatable restraint system of claim 13 wherein said motion sensing means comprises:

a crash sensor for generating said first control signal; and an accelerometer for generating said second control signal.

15. The inflatable restraint system of claim 14 wherein said accelerometer is a triaxial accelerometer operative to detect acceleration along each of three orthogonal axes of direction.

16. An inflatable restraint system for use in a vehicle for protecting at least one occupant from injury during collision or other loss of vehicle control, the system comprising:

a) an air bag housing;

b) an inner air bag and an outer air bag, said inner and outer air bags each being securely attached to said air bag housing;

c) actuator means for inflating and deflating said inner and outer air bags, said actuator means including:
i) a gas generator,
ii) a manifold in fluid communication with said gas generator and having a plurality of discharge ports, at least one of said plurality of discharge ports being in fluid communication with said inner air bag, at least one of said plurality of discharge ports being in fluid communication with said outer air bag;

d) motion sensing means for sensing motion of the vehicle, said motion sensing means including:
i) a crash sensor for generating an air bag inflation signal, and
ii) a triaxial accelerometer for detecting acceleration along each of the three orthogonal axes of direction and generating an air bag deflation signal in response thereto;

e) controller means being operative with said motion sensing means and said actuator means for inflating said inner and outer air bags in response to said air bag inflation signal and controlling the deflation of at least one air bag in response to said air bag deflation signal; and f) whereby controlled deflation of said at least one air bag further protects the at least one occupant from injuries which often result from collision or other loss of vehicle control.

17. The inflatable restraint system of claim 16 wherein said controller means controls deflation of said inner air bag in response to said air bag deflation signal.

18. The inflatable restraint system of claim 16 wherein said controller means controls deflation of said outer air bag in response to said air bag deflation signal.

19. The inflatable restraint system of claim 16 wherein said controller means delays the deflation of said at least one air bag in response to said air bag deflation signal.

20. The inflatable restraint system of claim 16 wherein said controller means retards the deflation of said at least one air bag in response to said air bag deflation signal.

* * * * *